United States Patent [19]

Brandinger

[11] 3,735,033

[45] May 22, 1973

[54] TELEVISION CAMERA SYSTEM WITH ENHANCED FREQUENCY RESPONSE

[75] Inventor: Jay Jerome Brandinger, Trenton, N.J.

[73] Assignee: RCA Corporation, New York, N.Y.

[22] Filed: Mar. 17, 1972

[21] Appl. No.: 235,587

[52] U.S. Cl. ....................178/5.4 ST

[51] Int. Cl. ....................H04n 9/06

[58] Field of Search ....................178/5.4 ST

[56] References Cited

UNITED STATES PATENTS 3,001,012 9/1961 Braicks ....................178/5.4 ST

*Primary Examiner*—Robert L. Griffin
*Assistant Examiner*—George G. Stellar
*Attorney*—Eugene M. Whitacre and Paul J. Rasmussen et al.

[57] ABSTRACT

Light from a scene is directed through the faceplate of an image pickup having an electron gun operative to produce an electron beam. The light impinges upon a layered target structure including a photoconductor and a conductive signal electrode. The target structure comprising a plurality of parallel elongated areas of varying conductivity such that the scanning of an electron beam across the target structure produces a composite video signal containing information representative of the image formed on the target and periodic current impulses whose frequency is above the predetermined range of frequencies of the video signal information and is representative of the parallel elongated areas of varying conductivity.

Means are provided for separating the video signal information from the index signal. Other embodiments of the invention include the use of filters with the invention for producing electrical signals representative of a scene and use of the index signal to demodulate the color representative signals.

18 Claims, 16 Drawing Figures

PATENTED MAY 22 1973

3,735,033

SHEET 1 OF 6

TELEVISION CAMERA SYSTEM WITH ENHANCED FREQUENCY RESPONSE

BACKGROUND OF THE INVENTION

This invention relates to television camera systems and more particularly, to a television camera system for encoding a plurality of information signals as phase and amplitude modulation of a carrier wave with an integrally related indexing signal derived from scanning. One example of the use of this invention is in single-tube color encoding camera systems.

One way to encode a plurality of colors with a single image pickup device such as a vidicon utilized in a television camera is to spatially encode the colors impinging on the photosensitive electrode of the pickup device. The encoding may be accomplished by utilizing a spatial color encoding filter disposed in the optical path to the image pickup device to spatially separate the different colored light passing therethrough. The filter may be adjacent the transparent conductive electrode of the pickup device in which case a relatively simple optical system is utilized to image the scene onto the photoconductor. Alternatively, it may be desirable to place the encoding filter in the optical path some distance from the photoconductor in which case a relay lens assembly is utilized to image the scene and the encoding filter pattern onto the photoconductor.

One type of spatial color encoding filter comprises a single color encoding grating including a repeating pattern of several different color stripes. Colored light encoded by a filter of this type produces when scanned, an electrical signal containing the colored light information as phase and amplitude modulation of a suppressed carrier wave. The carrier wave frequency is determined by the number of repeating color stripe groups and the rate of scanning. The phase of a particular color representative signal relative to the other colors is determined by the position of its color encoding stripe within the group.

A phase and amplitude modulation color encoding system of this type has the advantage of generating no subcarrier when a gray or white scene is present. This results in maximum dynamic range of the pickup device and inherent color balance. The system also has the ability of containing information representative of a plurality of colors within a relatively narrow band of frequences enabling use of other portions of the available frequency spectrum of he pickup device for containing the luminance representative information of the scene.

However, in a phase modulation color encoding system it is necessary to provide a reference or indexing signal which can be utilized to demodulate the phase and amplitude modulation of the suppressed carrier wave and its sidebands containing the color information. Nonlinearities in this scanning system make it desirable to provide an indexing signal which accompanies the phase modulated color representative carrier wave so that both are affected similarly by any system nonlinearities and proper demodulation may be achieved.

A variety of means exists for generating an indexing signal in specific relationship to a color signal produced by scanning of an image encoded by a stripe filter. One such scheme uses a separate light source to illuminate an additional grating imaged on the photosensitive material of the image pickup device.

Another approach uses an opaque or black index stripe periodically interspersed in the color encoding stripe pattern to produce a reference or index wave when scanned. In this system when no scene illumination is present, the index is lost.

A problem associated with indexing systems using phase demodulation is the choice of index frequency. If the index frequency is at the color carrier frequency, extraction of the index signal becomes difficult. When the index frequency is greater or less than the color carrier frequency, the index frequency causes phase errors in demodulating the color carrier. This error is known as color pulling. The problem of color pulling is more fully explained in U.S. Pat. No. 2,962,546 issued to Thompson.

When a frequency different than the color carrier frequency is chosen for the index carrier an electrical beating between the two carriers will result. Assuming a 4.0MHz color carrier, and a 6.0MHz index carrier, a 2MHz beat will fall within the luminance portion of the composite signal. To overcome this, the indexing frequency should be chosen high enough such that the beat falls outside the luminance bandwidth. But the optical response of the pickup tube will limit this choice of indexing frequency.

Other inherent disadvantages associated with the above mentioned systems include poor signal-to-noise-ratio; a high light loss due to optical scattering and primary color filtering; low sensitivity; loss of dynamic range; and loss of index signal resolution when the produced index signal is at a higher frequency than the color carrier frequency due to the limited optical response of the pickup device. The invention is not limited to a system; it also includes a target structure alone or in an image pick-up device.

SUMMARY OF THE INVENTION

A television camera system according to the invention includes an image pickup device comprising a faceplate, an electron gun operative to produce an electron beam and a layered target structure. The target structure is comprised of a conductive signal electrode and a plurality of parallel elongated areas providing a first conductive characteristic between the electron gun and the signal electrode when these areas are addressed by the electron beam. A second plurality of parallel elongated areas which separate the first plurality of areas provide a different conductivity characteristic between the electron gun and the signal electrode when the second plurality of areas are addressed by the electron beam. Circuitry is connected between the signal electrode and the electron gun to derive a composite electrical signal representative of light from an image directed through the faceplate and impinging upon the target. The composite signal contains video signal information of the image and an indexing signal resulting from the electron beam scanning across the first nd second pluralities of parallel elongated areas, the frequency of the indexing signal being above the frequency range of the video signal information. The system also includes circuitry for separating the indexing signal from the video signal information. The above invention allows an indexing signal to be present when no light is impinging upon the target structure and allows an index signal to be produced whose electrical frequency response is above the optical frequency response of the image pickup device.

An embodiment of this invention includes a layered target structure with a photoconductor layer having one side addressed by the electron beam and the other side adjacent the signal electrode where the signal electrode is formed of a plurality of spaced elongated parallel areas.

An alternative embodiment of the invention includes a transparent conductive layer adjacent the faceplate and the photoconductor layer being formed of a plurality of spaced elongated parallel areas. If in the above embodiment, the photoconductor layer is formed of a plurality of spaced elongated parallel areas of a first conductivity alternating with a plurality of spaced elongated areas of photoconductor of a second conductivity, a third embodiment of the invention is achieved.

A fourth and fifth embodiment of the invention is achieved by having a layer of transparent conductor adjacent the faceplate and disposed over the transparent conductor a layer of photoconductor. Disposed over the photoconductor layer will be a material comprising a plurality of spaced elongated parallel areas of material. The material can be either conductive and connected to the signal electrode of it can be an insulator. In the above embodiment using a conductive material a separate connection can be made to obtain an independent source of index signal.

In all the above embodiments, a color encoding filter is used with the invention to produce a plurality of signals representative of the chrominance information of the scene. The chrominance information is contained in a suppressed color carrier signal derived during scanning of the target structure that is phase and amplitude modulated in accordance with the hue and saturation of the object scene.

In further embodiments of the invention, ambiguity resolving structure in the target and associative circuitry is incorporated in the above described embodiments of the invention to produce and detect an ambiguity resolving signal to resolve ambiguities in the phase of the indexing signal relative to the color encoding stripes.

A more detailed description of the invention is given in the following specification and accompanying drawings of which:

FIG. 1*a* is a block diagram of an embodiment of a single tube color television camera system embodying the invention;

FIG. 1*b* is a curve representative of the color, brightness and index signal frequency spectrum of the system shown in FIG. 1*a;*

FIG. 2 is a plan view of an image pickup device target configuration in accordance with one embodiment of the invention and useful in the system of FIG. 1*a;*

FIG. 3*a* is a cross sectional view of a portion of the target configuration shown in FIG. 2;

FIG. 3*b* contains curves representative of transmission characteristics of different color encoding filters used in conjunction with the target structure of FIG. 2;

FIG. 3*c* is a top view of a color encoding filter, the stripes of which are angularly disposed to the direction of scan of a scanning beam;

FIG. 4*a* is a diagram representing the deflection characteristics of an electron beam as it crosses the target of the image pickup device shown in FIGS. 2 and 3*a;*

FIG. 4*b* contains curves representing the optical and enhanced electrical response of a vidicon tube embodying the invention;

FIGS. 5*a* and *b* contain two partial cross-sectional views of different target configurations for the image pickup device of FIGS. 2 and 3*a* for producing an index signal ambiguity resolving pulse;

DESCRIPTION OF THE INVENTION

Figures 1A, 1B:
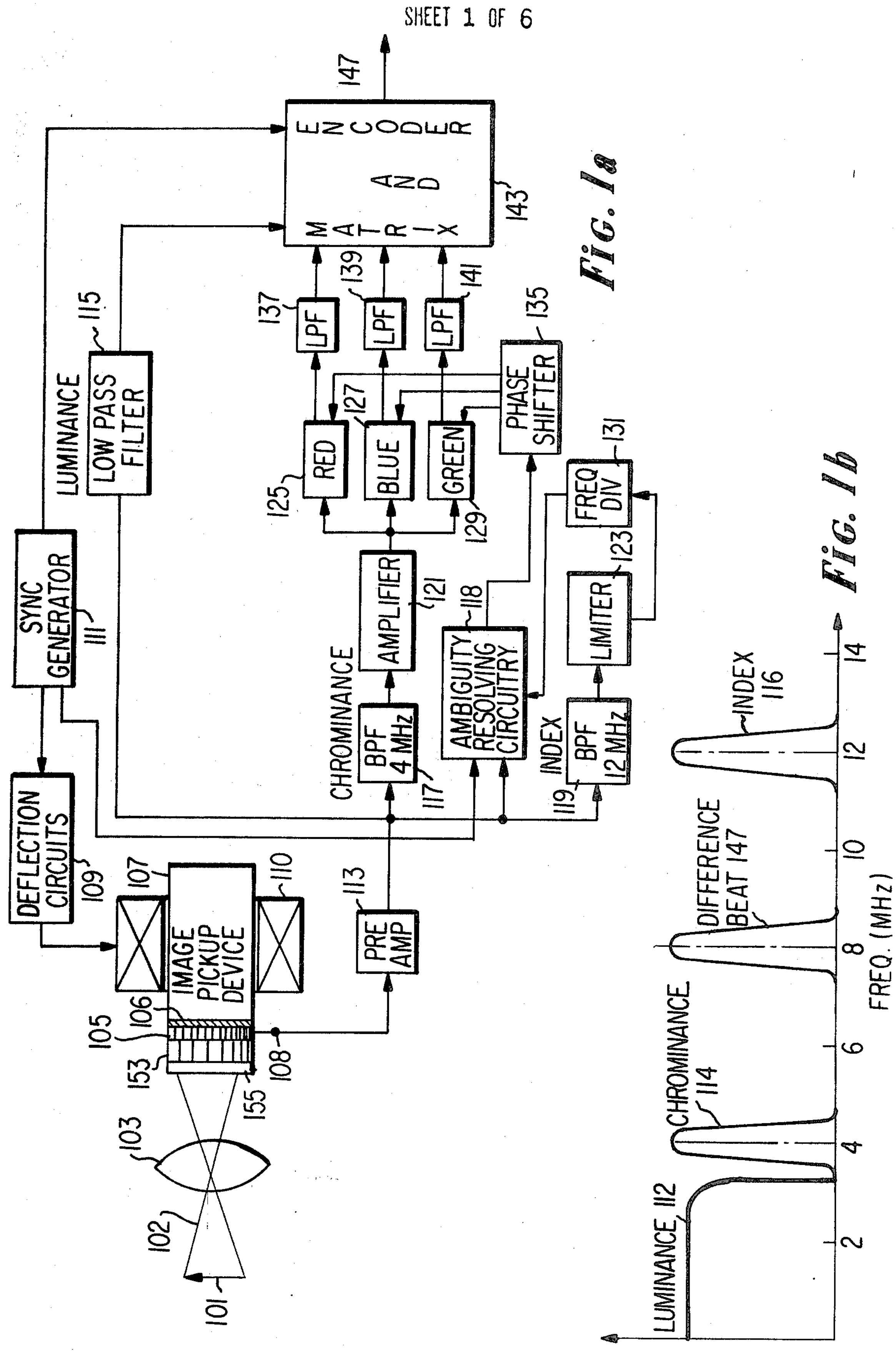

FIG. 1a is a block diagram of a single tube color camera system for producing color representative signals and an index signal and FIG. 1*b* is a curve representative of the color, brightness and index signal spectrum utilized in the system shown in FIG. 1*a*. Light rays 102 from an object 101 are directed by an objective lens 103 to the faceplate 155 of an image pickup device 107. Adjacent the inner surface of faceplate 155 are a color encoding filter 153, an indexing target structure 105 and a photoconductor 106. Image pickup device 107 may be a vidicon, for example, which operates in a conventional manner. Synchronizing signals are coupled from a synchronizing generator 111 to deflection circuits 109 for producing suitable deflection waves which are in turn coupled to the vertical and horizontal deflection coils 110 of image pickup device 107.

The color encoding filter 153 and indexing structure 105 adjacent the faceplate 155 are constructed so that as the electron beam of image pickup device 107 is scanned over the photoconductor 106, a composite electrical signal including luminance information, encoded color or chrominance information, an ambiguity resolving pulse and an index signal is obtained from output terminal 108.

In FIG. 1b the curve 112 shows that the luminance information signals occupy the spectrum from 0 to 3.5MHz. The curve 114 indicates that the chrominance information frequency spectrum extends from 3.5MHz to 4.5MHz centered around 4.0MHz. The third curve 116 shows that the index signal occupies the frequency spectrum between 11.5 and 12.5MHz centered around 12.0MHz. Curve 147 represents the difference beat between the index and chrominance signals.

The composite signal from output terminal 108 is amplified by preamplifier 113 and then coupled to three separate bandpass filters 115, 117 and 119. The first filter 115 is a low-pass filter which has a bandwidth extending from 0 to approximately 3.5MHz. This filter is used to separate the luminance information portion from the composite signal.

Bandpass filter 117 separates the color information components from the luminance and index components of the composite signal. Bandpass filter 117 has a center frequency of 4.0MHz and a bandpass of 1MHz. The frequency of the suppressed color carrier wave is determined by the number of red, green and blue color stripe groups scanned in the time of a horizontal scan line. In a similar manner, the index structure 105 in this embodiment produces a 12MHz index frequency when scanned.

The index signal is separated from the composite signal by bandpass filter 119 having a center frequency of 12MHz and a bandpass of 1MHz. The index signal obtained from filter 119 is coupled to a limiter 123 which produces a constant amplitude index signal. This limited index signal is then coupled from limiter 123 to frequency divider 131. In this embodiment of the invention where the index frequency was chosen as 12MHz, frequency divider 131 divides the index frequency by three to produce a frequency of 4MHz — a frequency equal to the color carrier frequency. The index signal from frequency divider 131 is then coupled to ambiguity resolving circuitry 118. Operation of the ambiguity resolving circuitry will be described in conjunction with FIG. 6.

The ambiguity resolving circuitry produces a signal of the same frequency as the color representative carrier wave and is coupled to phase shifter 135. Phase shifter 135 then generates three index signals which have no ambiguity in polarity and which are phase related to the chrominance signal from bandpass filter 117 such that they can serve to demodulate the color representative carrier wave.

The chrominance information obtained from filter 117 is coupled through amplifier 121 where the chrominance signal is amplified whereupon it then is coupled to a red synchronous detector 125, a blue synchronous detector 127 and a green synchronous detector 129. Detectors 125, 127 and 129 are controlled by the signals from phase shifter 135. Since the chrominance information is phase related to the index signal, phase shifter 135 produces the proper signal to detect the red, blue and green information of the object 101 from the composite chrominance signal. The detected red information obtained from synchronous detector 125 is coupled to a low-pass filter 137. The blue information signal is coupled to low-pass filter 139 and the green information signal is coupled to low-pass filter 141. Low-pass filters 137, 139 and 141 each have a bandpass of approximately 500KHz. The synchronous detectors 125, 127 and 129 are shown to detect signals representative of red, blue and green information respectively, but they can alternatively be used to detect signals representative of magenta, yellow and cyan or signals representative of other colors depending upon the type of encoding stripes used in the encoding filter 153.

The signal obtained from preamplifier 113 is passed through low pass filter 115 for passing bassband luminance signals up to approximately 3.5MHz. The luminance signal are then coupled to a matrix and encoder circuit 14 where it is combined with the red, blue and green signals from low-pass filters 137, 139 and 141. The color representative signals from low-pass filters 137, 139 and 141, the luminance signal from low-pass filter 115 and synchronizing information from the synchronizing generator 111 are combined in the matrix and encoder circuit 143 to produce a composite color television signal at output terminal 147 which may be suitable for transmission or for processing by video and color circuits of a television receiver.

Figure 2:
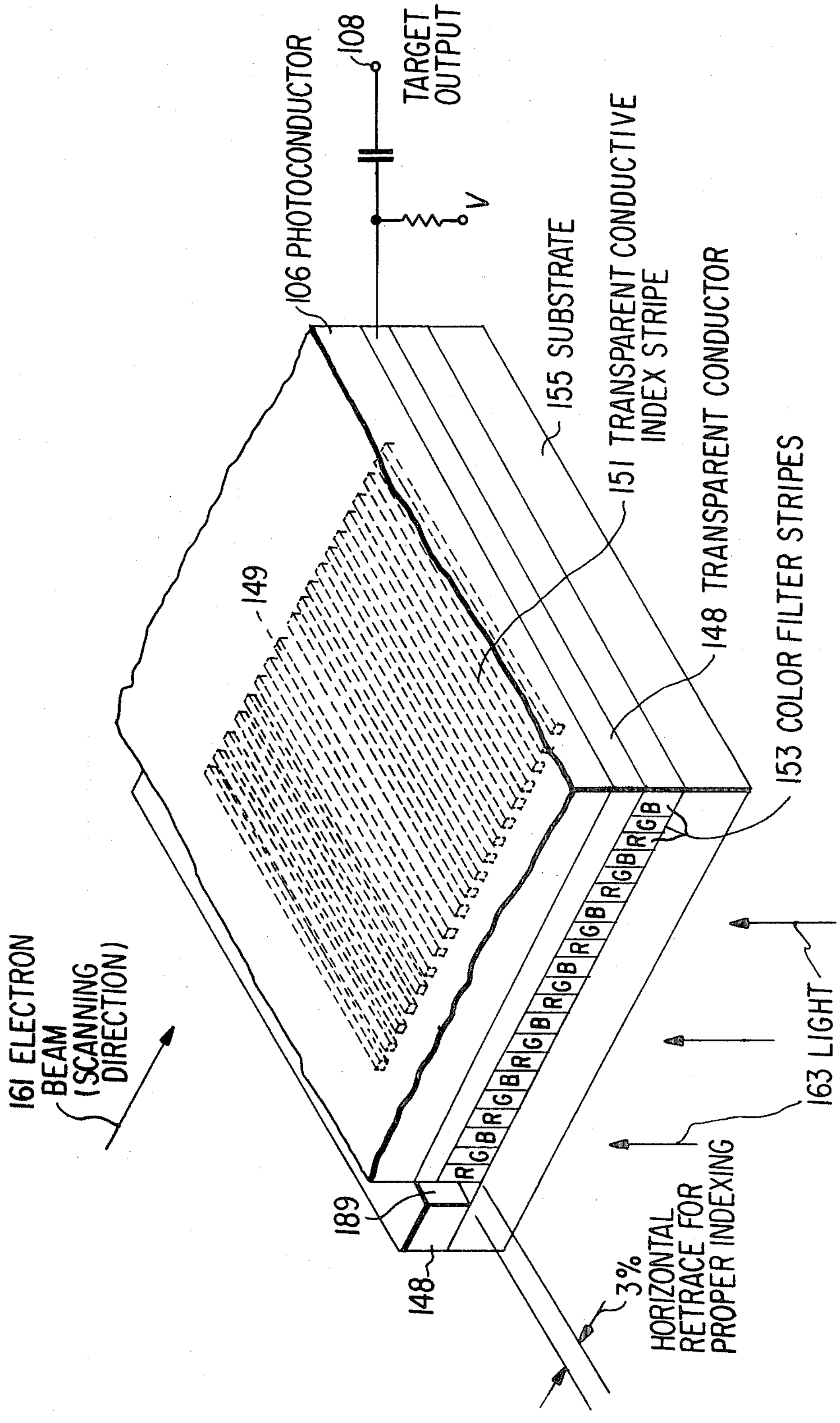
Figure 3A:
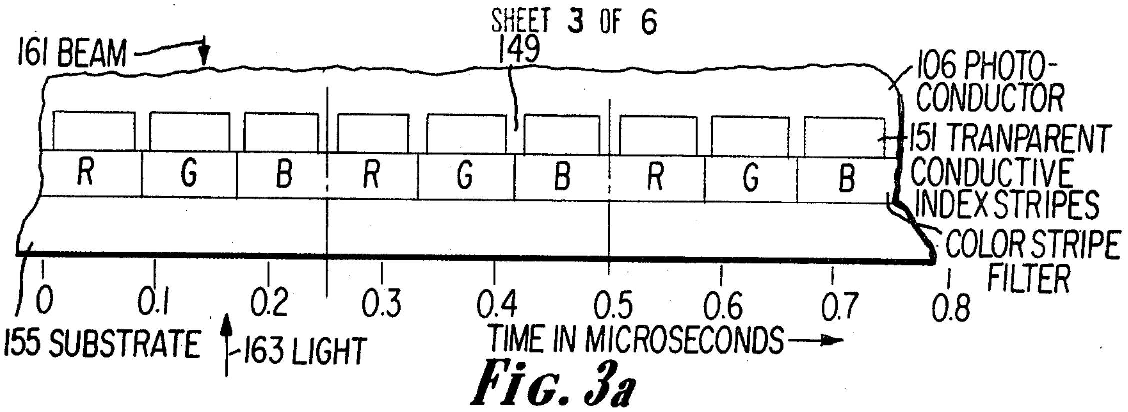
Figure 3B:
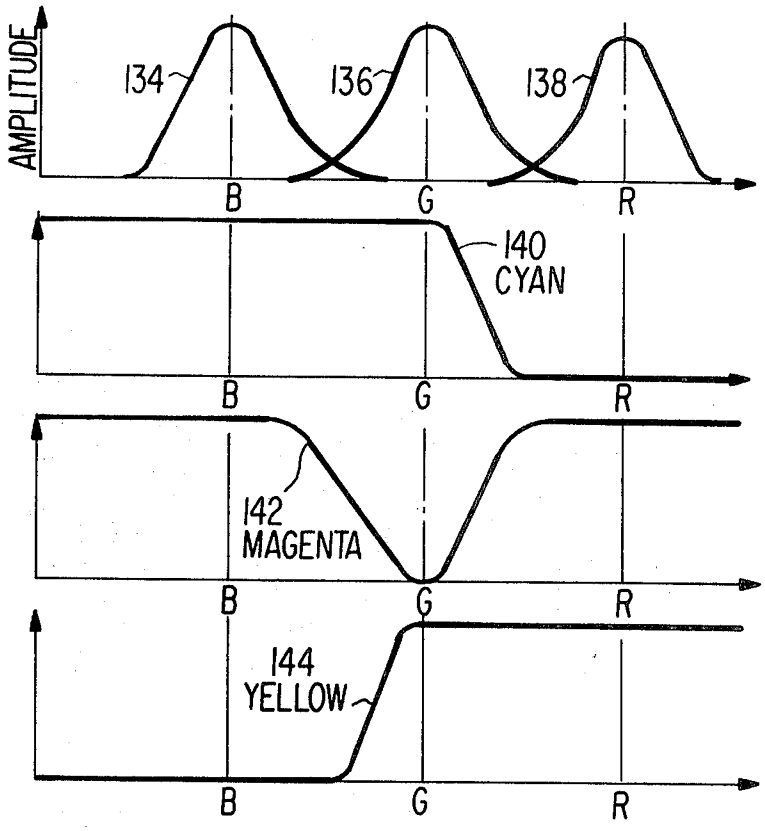

The image pickup tube target assembly is shown in FIGS. 2 and 3*a*. FIG. 2 is a perspective view not drawn to scale of the target assembly of FIG. 1*a*. FIG. 3*a* is a cross-sectional view of the target assembly and FIG. 3*b* represents transmission characteristics of color encoding filters.

The target assembly in FIG. 2 is comprised of four separate layers. The first layer is a substrate 155 which is a transparent material and can be the faceplate of a vidicon.

The second layer is the color encoding filter and is composed of color stripes 153 (e.g., dichroic filters, organic dyes, or Fabry Pierot filters). These filters can have the property of transmitting only blue, green or red light. Such filters would have the transmission characteristics represented by curves 134, 136 and 138, respectively of FIG. 3*b*. Alternatively, the color filters can be of the type that allow transmission of cyan, magenta and yellow as represented by curves 140, 142 and 144, respectively.

The color filters are deposited upon substrate 155 by techniques of photoprocessing, printing deposition, or evaporation. The color stripes spatially separate the color information and are arranged parallel to each other and in groups of three (i.e., red, green and blue (RGB) stripes representing a single color group). The repetition of these color groups in the direction of the electron beam scan 161 along with the scan velocity determine the frequency of the electrical color carrier generated. For example, when 200 color groups are used, a color subcarrier frequency of about 3.6MHz is produced using NTSC television horizontal scanning rates.

Figure 3C:
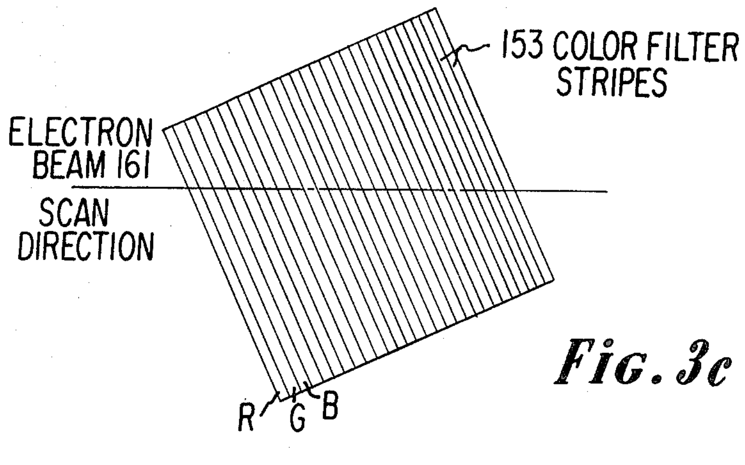

FIG. 3*c* illustrates the angular positioning of the stripes of a color encoding filter to the direction of horizontal scan of an electron beam of a vidicon tube. The color filter stripes 153 can be angularly disposed to the direction of scanning electron beam 161 as taught by R.D. Kell, U.S. Pat. No. 2,733,291, thereby allowing the frequency of the electrical color carrier generated to be varied, depending upon the angle of the color filter stripes to the electron beam while maintaining the same number of color filter stripes.

The third layer of the assembly shown in FIG. 2 is a transparent conductor target area 148 disposed over the color filter stripes. The conductor area 148 has a plurality of parallel elongated spaced slots 149 therethrough to produce an array of alternating conductive stripes 151 and nonconducting slots 149. The conducting and nonconducting areas are parallel to the color filters stripes to within 18 milliradians or about 0.01° to maintain colorimetry to NTSC standards. The transparent conductive index stripes 151 are electrically connected together and requires only a single terminal external to the image pickup tube. The fabrication of the transparent conductive index stripes 151 and slots 149 can be done by any suitable method, i.e., photoresist processing. The target assembly ill produce an index signal when scanned by an electron beam, the index signal being used to decode the color information contained as phase modulation of the color representative carrier wave. For an index stripe frequency of 5MHz, the color stripe frequency could be as high as 4MHz in a conventional 1 inch vidicon.

The percentage of area which is covered by transparent conductor (duty cycle) has an effect upon he signal output. A duty cycle of 70 percent means that 70 percent of the combined RGB color encoding filter stripe area is covered by the transparent conductor and 30 percent would represent the total noncoducting areas. As the duty cycle is increased, the total amount of light which is effective in producing a signal current is increased, therefore, more luminance and color information can be obtained from a single line scan. At the same time the amplitude of the index signal produced in response to the beam passing over the noncoducting areas becomes smaller and smaller. The detection of these nonconducting areas, due to the decreased signal to noise ratio, becomes more difficult.

The scale at the bottom of substrate 155 of FIG. 3*a* represents the time in microseconds it takes the electron beam to travel from the left to the right of the portion target shown. To travel a full RGB color group, it would take 0.25 microseconds, producing therefore a color group frequency of 4MHz. The index frequency is three index slots 149 for every color group. Therefore, the index frequency is 12MHz. Since a duty cycle is the percentage ratio of the amount of conducting areas over the total area of a single color group, the duty cycle represented in FIG. 3*a*, for example, is drawn to show a 88 percent duty cycle. Difference beats between the index frequency of 12MHz and color carrier frequency of 4MHz appear at 8MHz as shown in FIG. 1*b*. This difference beat frequency is at a portion of the spectrum where it does not interfere with the luminance or color signals.

The fourth layer with reference to FIG. 3*a*, consists of a photoconductor 106 deposited over the transparent conductor 148.

Operation of the image pickup device 107 can be explained in the following manner: light 163 passes through transparent substrate 155 and impinges upon the color filter stripes 153. The light is spatially separated by the filters and impinges upon the transparent conductive stripes 151. Assuming there is no loss in transparent conductive strips 151, the light continues until it impinges upon the photoconductor 106 where the resistance of the photoconductor 106 is changed by the mount of light that is present. The electron beam 161 charges the photoconductive layer to about the potential of the image pickup tube cathode. The transparent conductive stripes 151 are maintained at a potential which is positive relative to the cathode. The amount of charge at any elemental area of the photoconductor which leaks to the transparent conductive stripes 151 is determined by the resistance of the photoconductor, which in turn is determined by the amount of light imaged thereon. The mount of charge deposited by the electron beam 161 during the next scanning is determined by how much leaked off since the last scanning. This amount of beam current corresponds to the amount of incident light at that particular area and causes a current to flow through a load impedance element, not shown, connected between the transparent conductive stripes 151 and the image pickup tube cathode.

When the electron beam 161 scans over the slots 149 in the conductive area 148 with its associative conductive stripes 151, no signal is produced representing a color. However, a signal representing the nonconducting area 149 is produced. A signal referred to as dark current is produced whether light is present or not. Therefore, when the electron beam scans across the total target area, a current is produced that varies with the mount of light present where a transparent conductive image stripe and light are present and will also represent the difference between current produced when a beam strikes the conducting and nonconducting areas. This therefore produces three signals: a first signal representative of the intensity of the light which varies the photoconductive resistance (which is the luminance portion of the composite signal); a second signal representative of the spatial position of where that light was present and determined by the color filters (this representing the chrominance signal) and a third signal, the index signal, produced by the alternating conducting and nonconducting areas.

Figure 4A:
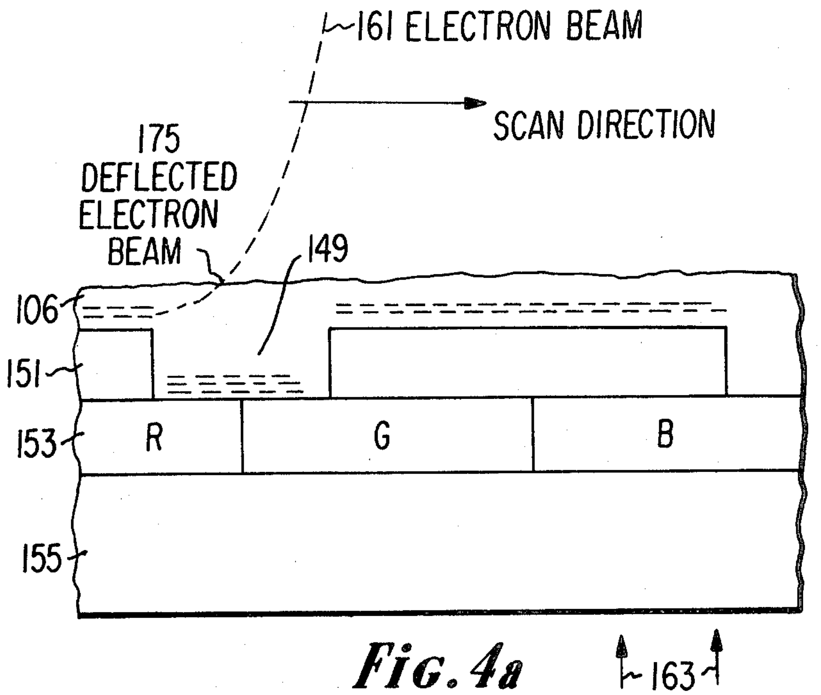

FIG. 4*a* is a diagram representing the deflection characteristics of an electron beam as it crosses a slot 149 of the target and indexing structure shown in FIG. 2. The electron beam deposits a negative charge on the photoconductor 106 overlying the slots 149 which is not easily dissipated to the conductive area 151. The negative charge on the photoconductor 106 overlying the adjacent conductive areas will be less in proportion o the amount of incident light in that area, and will be less even in the absence of light because of the leakage of the closely adjacent underlying conductive area 151. This leakage is referred to as dark current. Thus, as electron beam 161 scans over the portion of the photoconductor over the slot 149, the negative charge buildup in this area will repel the beam causing it to dwell longer on the portions of the photoconductor 106 overlying the edges of the conductive stripes 151. This action enhances the ability of the image pickup tube to resolve the slots 149 by a factor of at least 2 to 1 over the resolution of the equivalent optical image.

Figure 4B:
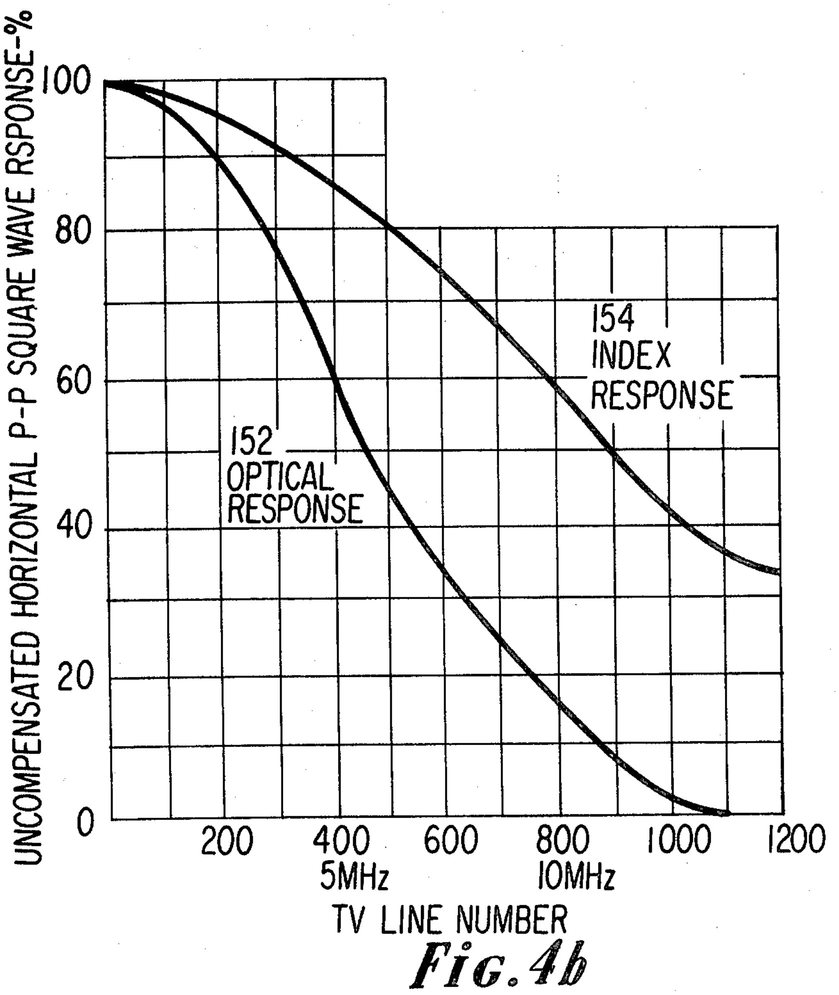

FIG. 4 *b* is a diagram representing the electrical and optical response of a vidicon tube. Curve 152 represents the optical response of the tube, while curve 154 represents the detectable electrical response of a tube utilizing the applicant's invention for producing an indexing signal. Experimental tests of standard 1-inch antimony trisulfide vidicons modified with striped transparent conductive areas, in repetition rates of 500, 1,000 and 2,000 lines per inch gave useful electrical index signals from 4.5 to 18MHz. The ability of this invention to produce an electrical index signal beyond the optical resolution of the vidicon tube permits the useful optical resolution of the image pickup device to be used for the generation of video signals, and at the same time permits an indexing signal of a frequency near the limit or outside the limit of the frequency response of the device to be generated. A higher frequency index signal is useful in eliminating color pulling and beating between color stripes and index stripes due to the ease of separating higher frequency index signals from the color carrier signals and the higher degree of phase accuracy produced by the index signal representing the location of the color stripes.

The invention also improves the optical resolution of a pickup device, since the pickup device's ability to detect a visual image is improved due to the reduced scattering within the target structure.

When the indexing frequency is higher than the color carrier frequency, the indexing frequency is operated on by a multiplying and dividing unit to produce a reduced indexing frequency equal to the color carrier frequency. If the indexing frequency is 12MHz and the color subcarrier is 4MHz the indexing frequency must be divided electronically by three to provide a reduced indexing frequency of 4MHz. If the indexing frequency is 10MHz, it is first multipled by two and divided by five to produce a 4MHz reduced indexing frequency. The zero point in time of the index frequency which corresponds to the zero point in time of the chrominance or color carrier frequency must be determined. If the wrong zero point is chosen, the reduced indexing frequency will be out of phase with the chrominance carrier wave resulting in its improper demodulation. Choosing the proper starting point is also necessary to insure proper demodulation. This is referred to as an ambituity problem and can also be caused by uncertainties in the retrace timing of the image pickup device. There is therefore a need to provide information at the start (or end) of the horizontal scan to establish the proper decoding phase for the index signal.

One approach to resolving the ambiguity problem is to provide at the start of a horizontal scan a fixed timing reference. This is illustrated as a break in the transparent conductive layer 148 shown as 189 in FIGS. 5*a* and 5*b*.

Figures 5A, 5B, 6, 7:
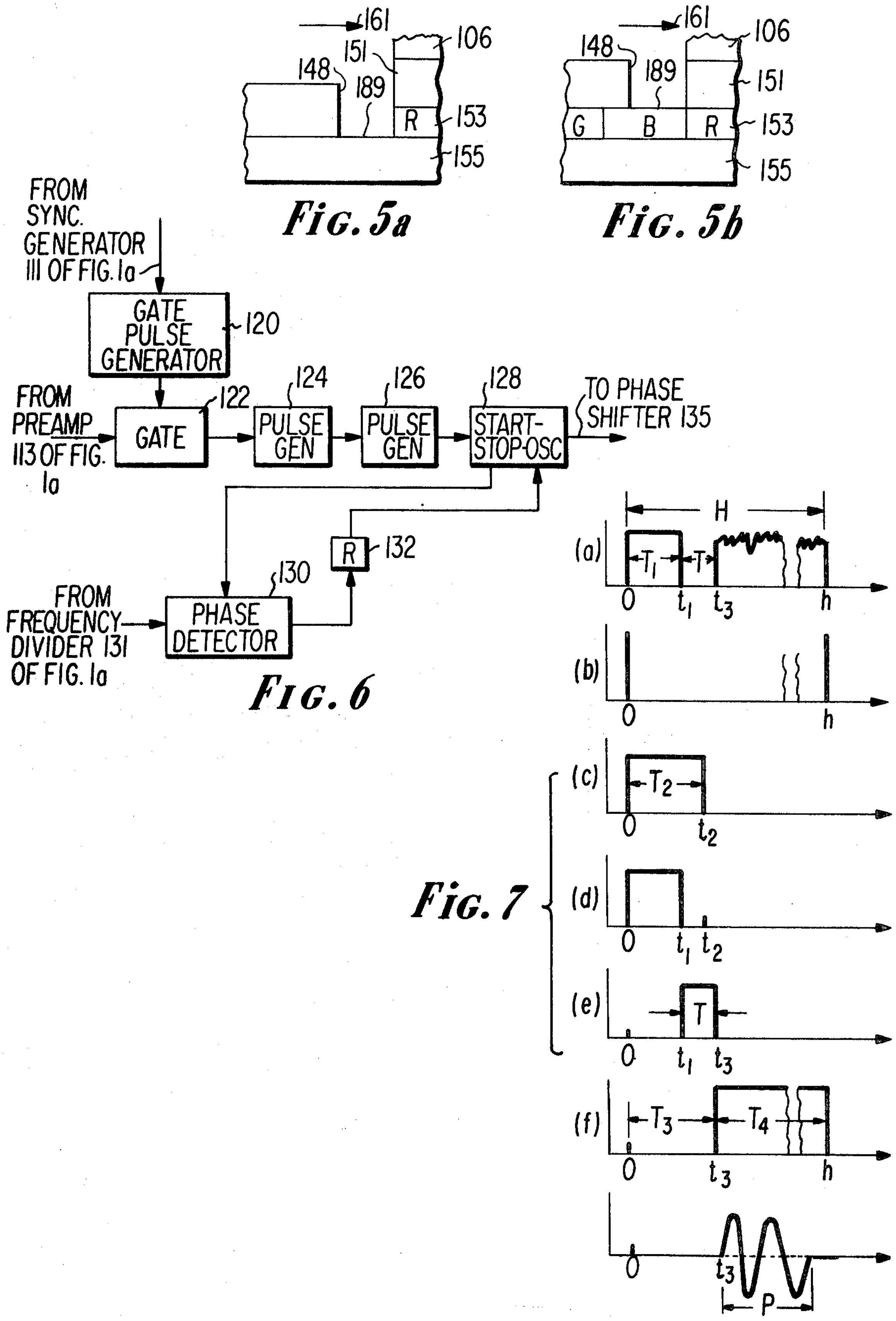
FIG. 6 is a block diagram showing the ambiguity resolving circuitry of FIG. 1*a* in more detail.
FIG. 7 is a graph showing signal waveforms associated with the ambiguity resolving circuitry shown in FIG. 6.

FIGS. 5*a* and 5*b* show cross-sectional views of an end portion of the target assembly. These views show two structures used to produce the necessary timing reference.

The structure shown in FIG. 5*a* is used when the color filter stripes 153 are of a material that has conductive characteristics when an electron beam comes in contact with them, i.e., Fabry Pierot filters. The structure shown in FIG. 5*b* is used when the color filter stripes 153 have nonconductive characteristics, i.e., dichroic filters. When the electron beam 161 impinges on a non-conducting area 189, substantially no output signal is produced.

The lead in interval needed to produce the start up timing signal is comprised of a break in the transparent conductive coating 148 such that electron scanning beam sees at the start of the horizontal scan a fixed timing reference. The electron scanning beam moving in a direction indicated by the arrow 161 first strikes the transparent conductor 148 producing an enhanced signal, since there is a direct addressing of the transparent conductor 148 without the presence of photoconductor 106 (a whiter than white signal). The electron beam then strikes either substrate 155 of FIG. 5*a* or filter stripes 153 of FIG. 5*b*, prior to the first color stripe group producing little or no signal output (a blacker than black signal). The beam then strikes the target area containing photoconductor producing a rise in signal output. In FIG. 5*a*, the sudden drop and subsequent rise produces the reference timing signal.

FIG. 7 illustrates the timing and generation of the pulse occurring at the start of each horizontal line scan to enable proper timing between the color carrier wave and the index signal which is used to demodulate the color carrier wave. The time interval between the drop and rise in signal output is designated by the time interval T as shown in FIG. 7*a*. The beam continues on completing a single line scan of duration H (horizontal scan time). The time interval $T_1$ plus T of FIG. 7*a* depends on the time required to establish the phase reference. During the interval $T_1$, the beam impinges upon transparent conductor 148 in FIGS. 5*a* and 5*b*. The time interval $T_1$+T includes the equivalent frequency response of the conductor-to-conductor transition, the bandwidth of the electrical circuits used to extract the start up timing signal, the accuracy of the timing required to establish the start-up signal phase and the signal-to-noise ratio of the start up signal.

The ambiguity resolving circuitry shown as a single block 118 in FIG. 1 is shown in a more detailed functional block diagram form in FIG. 6. There are three input signals used to resolve the ambiguity. One is the composite signal from the pickup tube represented by FIG. 7*a*. This signal contains information of when the scanning beam has first contacted the transparent conductive layer 148, represented by time 0 in FIG. 7*a*, and also when the beam has first contacted substrate 155 of FIG. 5*a* represented by time $t_1$, in FIG. 7*a*. The second input signal is from the frequency divider 131 of FIG. 1*a*. The third signal is one representing the start of the horizontal scan period. Therefore, from FIG. 1*a*, signals from sync generator 111, represented by the pulses shown in FIG. 7*b* are coupled to gate pulse generator 120 of FIG. 6. The gate pulse generator 120 is therefore controlled by the horizontal pulses controlling the deflecting coils 110 of image pickup device 107 of FIG. 1*a*. The control signal is comprised of two pulses separated by a period of H duration. The gate pulse generator 120 produces a pulse of duration $T_2$ and is represented by FIG. 7*c*. The pulses from gate pulse generator 120 are used to control gate 122. Gate 122 is also receiving a signal from preamplifier 131 of FIG. 1*a*. Gate 122 will only allow a signal of $T_2$ duration from preamplifier 113 to pass, and is represented by the waveform in FIG. 7*d*. The signal from gate 122 of FIG. 6 is coupled to pulse generator 124 which uses the trailing edge of the pulse from gate 122 to produce a pulse of $T$ duration represented by FIG. 7*e*, where $t_3 - t_1 = T$. The time period $T_3$ shown in FIG. 7*f* is the time it takes for the scanning beam to reach the beginning of the target area to be decoded. At time $t_3$, there is present a trailing edge of the pulse from pulse generator 124 as shown in FIG. 7*e*. The signal from pulse generator 124 of FIG. 6 is then coupled to pulse generator 126. Pulse generator 126 produces a pulse whose period of duration $T_4$ starts at $t_3$ and will end at the time $h$. This signal is represented by the waveform in FIG. 7*f*. The signal from pulse generator 126 is coupled to start-stop oscillator 128 which will start oscillating at time $t_3$ and will stop oscillating at the end of the horizontal scan period at time $h$. The frequency of oscillation of start-stop oscillator 128 is controlled by phase detector 130 and reactance control 132. Phase detector 130 receives a signal from frequency divider 131. This signal contains the frequency at which oscillator 128 should be oscillating, i.e., 4MHz, the same frequency as the color carrier wave. Due to nonlinearities of the scanning system, the index frequency is not at a constant frequency. The frequency of the start-stop oscillator 128 is therefore compared to the nonlinear reduced index frequency by phase detector 130 and this difference signal is coupled to reactance control 132. Reactance control 132 is then coupled to the start-stop oscillator 128. Reactance control 132 receives the signal from phase detector 130 and varies the frequency and phase of the start-stop oscillator such that it provides the proper demodulation of the chrominance signal. The output of the start-stop oscillator is shown in FIG. 7*g*. Exact duplication of the nonlinearities of the system are produced in the frequency variations of the start-stop oscillator.

Since the signal from start-stop oscillator starts at the precise time that the electron beam begins scanning the desired target area, thereby providing the proper zero crossover point and the phase detector 130 provides the proper phasing, the ambiguity between the indexing signal and the color carrier signal has been resolved. The 4MHz index signal from the start-stop oscillator 128 of FIG. 6 is then coupled to phase shifter 135 of FIG. 1a where three 4MHz signals are produced which are phase shifted 120° from one another. The red, green and blue phase modulated components of the chrominance signal can now be accurately demodulated without ambiguity errors.

Alternative embodiments of a color encoding and indexing assembly which may be used as a target structure in FIG. 1*a* are shown in FIG. 8. FIG. 8*a*, shows strips of conductive material 183 deposited in a stripped pattern over photoconductor 106. The conducting strips 183 are connected together and electrically connected to the transparent conductor 148 to produce a high amplitude output waveform. This configuration will produce a white signal when electron beam 161 strikes the conducting strips 183. The index signal produced is easily distinguishable from the composite signal containing the chrominance and luminance information. In the above embodiment using a conductive material, a separate connection can be made to obtain an independent source of index signal.

Figure 8A:
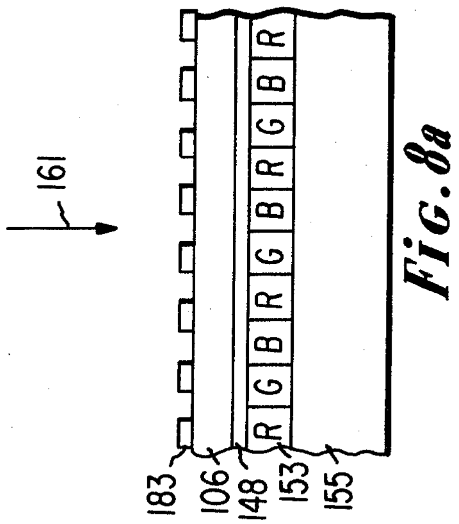
FIGS. 8*a* – 8*d* are cross-sectional views of four different embodiments of portions of the target structure embodying the invention.
Figure 8B:
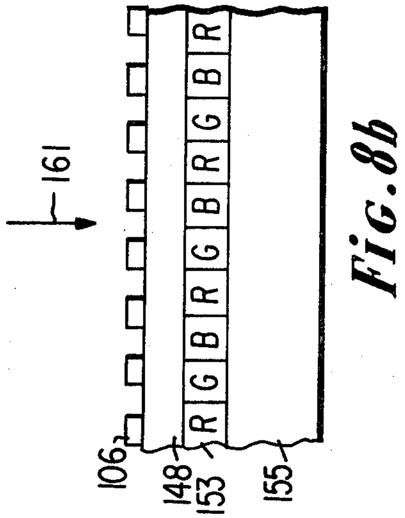

FIG. 8*b* shows photoconductor 106 deposited in a striped pattern over transparent conductor 148. This configuration will also produce a high amplitude signal when electron beam 161 strikes the photoconductor 106.

Figure 8C:
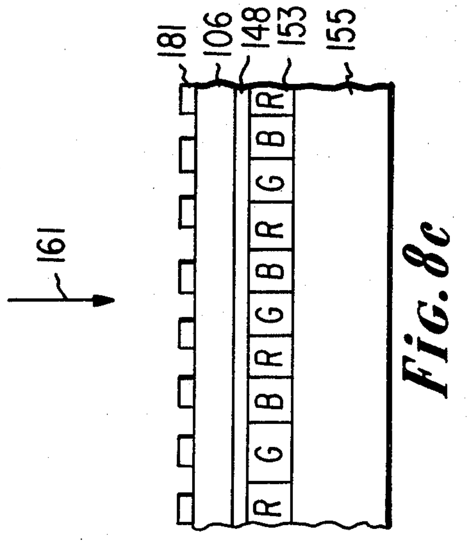
Figure 8D:
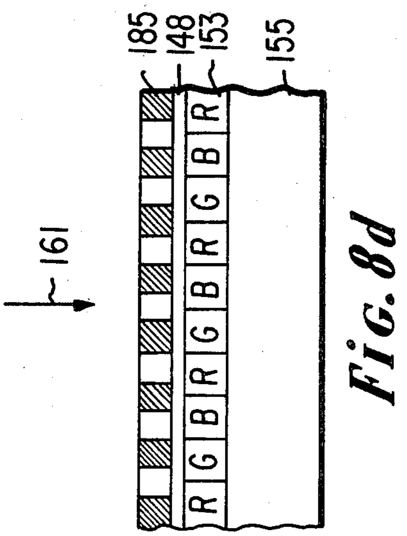

FIG. 8*c* shows a variation of the color encoding and indexing assembly in FIG. 8*a* in which dielectric strips 181 are deposited in a pattern instead of conductor strips 183 of FIG. 8*a*. There is no need to connect the dielectric strips together, since the dielectric 181 is charged by secondary emissions of the electron beam thereby repelling the electrons from the beam. This will create a blacker-than-black index signal. FIG. 8*d* shows a variation of FIG. 8*b*. The photoconductor 185 has been doped to produce elongated parallel areas of varying conductivity. The conductor can be doped for lower or higher resistivity or lower or higher photoconductivity.

All the above embodiments can be used to produce an index signal at a frequency higher than the color carrier frequency and higher than the optical resolution of the image pickup device.

Another embodiment of this invention is to utilize a spectral encoding filter that is sensitive to electromagnetic radiation other than in the visible radiation spectrum. For example, silicon and germanium filters could be used to filter infrared radiation and display this radiation as a color on the viewing screen, each color corresponding to the different wavelength of radiation that has been filtered. Alternatively, multispectral filters can be selected to transmit different ranges of ultraviolet radiation or combinations of ultraviolet, visible and infrared radiation. The one requirement of the encoding filter for the above embodiments is that the spectral filters when impinged by the proper radiation change the sensitivity of the photoconductor, thereby changing its resistance which allows a current of varying amplitude to be passed through the transparent conductive index material according to the amplitude of the filtered radiation reaching the transparent conductor. The decoding apparatus will be essentially the same as that used in the decoding of color and indexing information, while the luminance information could represent the actual luminance of the scene or the average radiation over a wide spectral range of the object being viewed.

What is claimed is:

1. A television camera system comprising:

an image pickup device including a faceplate, an electron gun operative to produce an electron beam and a target structure, said target structure disposed within said pickup device in the region of said faceplate;

said target structure comprising at least two layers including a conductive signal electrode layer and a photoconductor layer responsive to light passing through said faceplate for producing a charge on said photoconductor representative of said light, one of said layers containing a plurality of first and second parallel interleaved elongated areas for providing first and second areas of different conductivity characteristics as said electron beam is scanned over said target structure;

signal deriving means coupled to said signal electrode for deriving therefrom as said electron beam is scanned over said photoconductor a composite signal including first signal components representative of said light information and second signal components representative of said first and second interleaved areas of different conductivity characteristics, the pitch of said first and second interleaved areas being selected for producing said second signal components at a frequency higher than said first signal components; and means coupled to said signal deriving means for separating said first and second signal components.

2. A television camera system comprising:

an image pickup device including;

a transparent faceplate;

an electron gun operative to produce an electron beam;

a layered target structure including;

conductive signal electrode;

photoconductor layer having one side addressed by said electron beam and the other side adjacent said signal electrode; and said target structure being supported adjacent said transparent faceplate so that light from an image passes through said faceplate and said signal electrode to said photoconductor;

circuit means connected between said signal electrode and said electron gun to derive video signal information representative of an image formed on said photoconductor;

means included in said target structure for causing periodic current impulses to flow in said signal electrode when the electron beam is scanned thereacross, the frequency of said periodic impulses being above the predetermined range of frequencies of said video signal information; and means coupled to said circuit means and responsive to said current impulses for deriving a wave related in frequency to the frequency of said current impulses.

3. A television camera system as described in claim 2 wherein:

said means included in said target structure comprises a plurality of spaced elongated parallel areas.

4. A television camera system as described in claim 2 wherein:

said means included in said target structure comprises a plurality of spaced elongated parallel areas of material formed on the side of said photoconductor addressed by said electron beam.

5. A television camera system as described in claim 4 wherein:

said material is conductive and connected to said signal electrode.

6. A television camera system as described in claim 4 wherein:

said material is an insulator.

7. A television camera system as described in claim 2 wherein:

said means included in said target structure comprises said photoconductor layer being formed of a plurality of spaced elongated parallel areas of a first conductivity alternating with a plurality of spaced elongated parallel areas of photoconductor of a second conductivity.

8. A television camera system as described in claim 2 wherein:

said means included in said target structure comprises said photoconductor layer being formed of a plurality of spaced elongated parallel areas.

9. A television camera system as described in claim 4 wherein said material is conductive and said layered target structure includes an index electrode connected to said conductive material.

10. A television camera system comprising:

an image pickup device including;

a transparent faceplate;

an electron gun operative to produce an electron beam;

a layered target structure including a transparent conductive signal electrode, said target structure having a first plurality of parallel elongated areas providing a first conductivity characteristic between said electron gun and said signal electrode when said first areas are addressed by said electron beam, said first plurality of areas separated by a second plurality of parallel elongated areas which provide a different conductivity characteristic between said electron gun and said signal electrode when said second plurality of areas are addressed by said electron beam;

an encoding filter comprising groups of elongated parallel stripes, the stripes in each group having a different spectral response to light passing therethrough;

said target structure and said encoding filter being supported adjacent said transparent faceplate so that light from an image passes through said faceplate and said encoding filter before impinging on said target, the stripes of said encoding filter being positioned parallel to said first and second plurality of parallel elongated areas;

the number of parallel elongated areas of said first and second plurality of parallel elongated areas for a given distance being greater than the number of groups of elongated parallel stripes for the same distance;

circuit means connected between said signal electrode and said electron gun to derive a composite electrical signal including;

video information signal representative of an image formed on said target; 2 electrical carrier signal having a frequency determined by the number of groups of elongated parallel stripes scanned by said electron beam in a given time; and periodic current impulses having a frequency higher than said electrical carrier signal, the frequency of said periodic current impulses being determined by the number of elongated areas of said first and second plurality of parallel elongated areas scanned by said electron beam in said given time; and signal processing means coupled to said circuit means and responsive to said periodic current impulses for processing said composite electrical signal to derive a plurality of color representative signals.

11. A television camera system as claimed in claim 10 wherein:

said encoding filter is a color encoding filter comprising color groups of elongated parallel stripes for encoding red, green and blue light.

12. A television camera system as claimed in claim 11 wherein:

said color encoding filter comprises color groups of elongated parallel dichroic stripes for encoding red, green and blue light.

13. A television camera system according to claim 12 wherein:

said color group is comprised of cyan, magenta and yellow parallel dichroic stripes.

14. A television camera system according to claim 12 wherein:

said color groups of elongated parallel dichroic stripes are angularly disposed to the direction of scan of said electron beam, and said parallel elongated areas of said first and second plurality of parallel elongated areas parallel to said diagonal dichroic stripes.

15. A television camera system comprising:

an image pickup device including:

a transparent faceplate;

an electron gun operative to produce an electron beam;

a transparent layered target structure including a transparent conductive signal electrode, said target structure having a first plurality of parallel elongated areas providing a first conductivity characteristic between said electron gun and said signal electrode when said first areas are addressed by said electron beam, said first plurality of areas separated by a second plurality of parallel elongated areas which provide a different conductivity characteristic between said electron gun and said signal electrode when said second plurality of areas are addressed by said electron beam causing periodic current impulses to flow in said signal electrode, the frequency of said periodic current impulses being determined by the number of elongated areas of said first and second plurality of parallel elongated areas scanned by said electron beam in a given time;

said target structure being supported adjacent said transparent faceplate so that light from an image passes through said faceplate before impinging on said target;

circuit means connected between said signal electrode and said electron gun to derive a composite electrical signal representative of an image formed on said target;

ambiguity resolving signal producing means comprising:

third and fourth elongated areas substantially in the plane of and adjacent said target structure, said third and fourth elongated areas providing different conductivity characteristics between said electron gun and said conductive signal electrode when addressed by said electron beam to an ambiguity resolving signal; and signal processing means coupled to said circuit means and responsive to said periodic current impulses for deriving a wave related in frequency to the frequency of said current impulses.

16. A television camera system as described in claim 15 wherein:

said third elongated area comprises a conductive area connected to said signal electrode but paced therefrom by said fourth elongated area which is non-conductive

17. A television camera system as described in claim 15 wherein:

said image pickup device includes;

an encoding filter comprising groups of elongated parallel stripes, the stripes in each group having a different spectral response to light passing therethrough;

said target structure and said encoding filter being supported adjacent said transparent faceplate so that light from an image passes through said faceplate and said encoding filter before impinging on said target, the stripes of said encoding filter being positioned parallel to said first and second plurality of parallel elongated areas;

the number of parallel elongated areas of said first and second plurality of parallel elongated areas for a given distance being greater than the number of groups of elongated parallel stripes for the same distance, said composite electrical signal including, video information signal representative of an image formed on said target;

an electrical carrier signal having a frequency determined by the number of groups of elongated parallel stripes scanned by said electron gun in a given time; and periodic current impulses having a frequency higher than said electrical carrier signal, the frequency of said periodic current impulses being determined by the number of elongated areas of said first and second plurality of parallel elongated areas scanned by said electron beam in said given time; and signal processing means coupled to said circuit means comprising;

a first bandpass filter means coupled to said circuit means for separating said video information signal;

a second bandpass filter means coupled to said circuit means for separating said electrical carrier signals from said composite electrical signal;

third bandpass filter means coupled to said circuit means for separating said periodic current impulses from said composite electrical signal;

reference signal producing means coupled to said third bandpass filter means for producing a reference wave having the same frequency as said electrical carrier signal; and an ambiguity resolving means coupled to said circuit means for detecting said ambiguity resolving signal and to said reference signal producing means for resolving ambiguities in the phase of said reference wave.

18. A television camera system according to claim 17 wherein:

said signal processing means includes detector means coupled to said second bandpass filter means and said ambiguity resolving means for deriving color representative signals from said electrical carrier signal.

* * * * *